United States Patent
Yajima et al.

(10) Patent No.: US 10,454,121 B2
(45) Date of Patent: Oct. 22, 2019

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventors: Kentarou Yajima, Kanagawa (JP); Masanari Yanagisawa, Kanagawa (JP); Susumu Maeshima, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 15/781,248

(22) PCT Filed: Sep. 26, 2016

(86) PCT No.: PCT/JP2016/078262
§ 371 (c)(1),
(2) Date: Jun. 4, 2018

(87) PCT Pub. No.: WO2017/104213
PCT Pub. Date: Jun. 22, 2017

(65) Prior Publication Data
US 2018/0358639 A1    Dec. 13, 2018

(30) Foreign Application Priority Data
Dec. 15, 2015    (JP) .................. 2015-244472

(51) Int. Cl.
*H01M 8/04303*    (2016.01)
*H01M 8/04007*    (2016.01)
(Continued)

(52) U.S. Cl.
CPC ......... *H01M 8/04303* (2016.02); *B60L 50/50* (2019.02); *C01B 3/323* (2013.01);
(Continued)

(58) Field of Classification Search
None
See application file for complete search history.

(56) References Cited

U.S. PATENT DOCUMENTS

2002/0110710 A1    8/2002    Keskula et al.
2003/0093949 A1*   5/2003    Goebel ................ B01B 1/005
                                              48/127.9
(Continued)

FOREIGN PATENT DOCUMENTS

CN    101755357 A    6/2010
JP    2005-179081 A   7/2005
(Continued)

*Primary Examiner* — Kaity V Chandler
(74) *Attorney, Agent, or Firm* — Foley & Lardner LLP

(57) ABSTRACT

A fuel cell system includes a solid oxide fuel cell configured to receive a supply of an anode gas and a cathode gas to generate electric power. The fuel cell system includes an anode discharge passage through which an anode off-gas discharged from the fuel cell flows, a cathode discharge passage through which a cathode off-gas discharged from the fuel cell flows, a joining portion where the anode discharge passage and the cathode discharge passage join. The fuel cell system further includes a gas supply unit configured to supply a fuel gas using a fuel stored in a fuel tank into the anode discharge passage during a system stop.

17 Claims, 9 Drawing Sheets

(51) Int. Cl.
*H01M 8/0432* (2016.01)
*H01M 8/0444* (2016.01)
*H01M 8/0438* (2016.01)
*H01M 8/12* (2016.01)
*H01M 8/04537* (2016.01)
*H01M 8/04228* (2016.01)
*H01M 8/04955* (2016.01)
*H01M 8/04701* (2016.01)
*H01M 8/04746* (2016.01)
*H01M 8/1231* (2016.01)
*H01M 8/04223* (2016.01)
*B60L 50/50* (2019.01)
*C01B 3/32* (2006.01)
*H01M 8/124* (2016.01)

(52) U.S. Cl.
CPC ..... *H01M 8/0432* (2013.01); *H01M 8/04067* (2013.01); *H01M 8/04228* (2016.02); *H01M 8/04231* (2013.01); *H01M 8/04388* (2013.01); *H01M 8/04462* (2013.01); *H01M 8/04537* (2013.01); *H01M 8/04731* (2013.01); *H01M 8/04753* (2013.01); *H01M 8/04761* (2013.01); *H01M 8/04776* (2013.01); *H01M 8/04955* (2013.01); *H01M 8/12* (2013.01); *H01M 8/1231* (2016.02); *C01B 2203/0233* (2013.01); *C01B 2203/066* (2013.01); *C01B 2203/0827* (2013.01); *C01B 2203/1229* (2013.01); *C01B 2203/1619* (2013.01); *C01B 2203/1695* (2013.01); *H01M 8/04328* (2013.01); *H01M 8/04455* (2013.01); *H01M 2008/1293* (2013.01)

(56) References Cited

U.S. PATENT DOCUMENTS

| | | | |
|---|---|---|---|
| 2009/0047555 A1* | 2/2009 | Sugawara | H01M 8/2483 429/410 |
| 2010/0203411 A1 | 8/2010 | Hasuka | |
| 2017/0092969 A1 | 3/2017 | Kaneko et al. | |

FOREIGN PATENT DOCUMENTS

| | | |
|---|---|---|
| JP | 2010-55910 A | 3/2010 |
| JP | 2012-003850 A1 | 1/2012 |
| JP | 2014-163318 A | 9/2014 |
| JP | 2016-122584 A | 7/2016 |
| WO | WO 2015/177949 A1 | 11/2015 |

* cited by examiner

FUEL CELL SYSTEM AND CONTROL METHOD FOR FUEL CELL SYSTEM

TECHNICAL FIELD

The present invention relates to a fuel cell system including a solid oxide fuel cell configured to receive a supply of an anode gas and a cathode gas to generate electric power, and a control method for the fuel cell system.

BACKGROUND ART

Recently, the increasing concern over global environmental problems has seen the use of various kinds of fuel cells in automobiles coming under consideration. For example, in the case of a solid oxide fuel cell which is high in power generation efficiency, electric power is generated by an electrical chemical reaction between an anode gas containing, for example, hydrogen and hydrocarbons and a cathode gas containing oxygen.

JP2005-179081A discloses a fuel cell system that includes an anode discharge passage through which an anode off-gas discharged from a solid oxide fuel cell flows, a cathode discharge passage through which a cathode off-gas discharged from the solid oxide fuel cell flows, and a joining portion where these passages join. The anode off-gas and the cathode off-gas are combusted by a burner in the joining portion and then discharged outside the fuel cell system.

SUMMARY OF INVENTION

In such a solid oxide fuel cell system, a system stop control is executed in response to, for example, a system stop request. In the solid oxide fuel cell system, an operation temperature of a fuel cell is as high as approximately 800 degrees; therefore, in the system stop control, before an operation of the fuel cell system is completely stopped, a supply of an anode gas is stopped while a supply of a cathode gas is continued to cause an execution of a cooling process of the fuel cell. During the cooling process, the cathode gas (for example, an air) containing oxygen is continued to be supplied to a cathode side of the fuel cell, and the air, as a cathode off-gas, that has passed through the fuel cell flows into a joining portion through a cathode discharge passage.

Since the supply of the anode gas is stopped in the system stop control, a part of the air that has reached the joining portion flows into an anode discharge passage from this joining portion. As soon as a gas containing oxygen, such as an air, flows into the anode discharge passage, an oxygen concentration (oxygen partial pressure) in the anode discharge passage and an anode flow passage of the fuel cell increases. In a state where the oxygen concentration in the anode flow passage is high and the fuel cell is not sufficiently cooled, there is a possibility of an oxidative degradation of an anode electrode of the fuel cell.

Accordingly, an object of the present invention is to provide a technique that ensures reducing oxidative degradation of an anode electrode of a fuel cell during a system stop.

According to an aspect of the present invention, a fuel cell system includes a solid oxide fuel cell configured to receive a supply of an anode gas and a cathode gas to generate electric power. The fuel cell system includes an anode discharge passage through which an anode off-gas discharged from the fuel cell flows, a cathode discharge passage through which a cathode off-gas discharged from the fuel cell flows, a joining portion where the anode discharge passage and the cathode discharge passage join. The fuel cell system further includes a gas supply unit configured to supply a fuel gas using a fuel stored in a fuel tank into the anode discharge passage during a system stop.

DESCRIPTION OF EMBODIMENTS

The following describes the embodiments of the present invention with reference to the drawings.

First Embodiment

Figure 1:
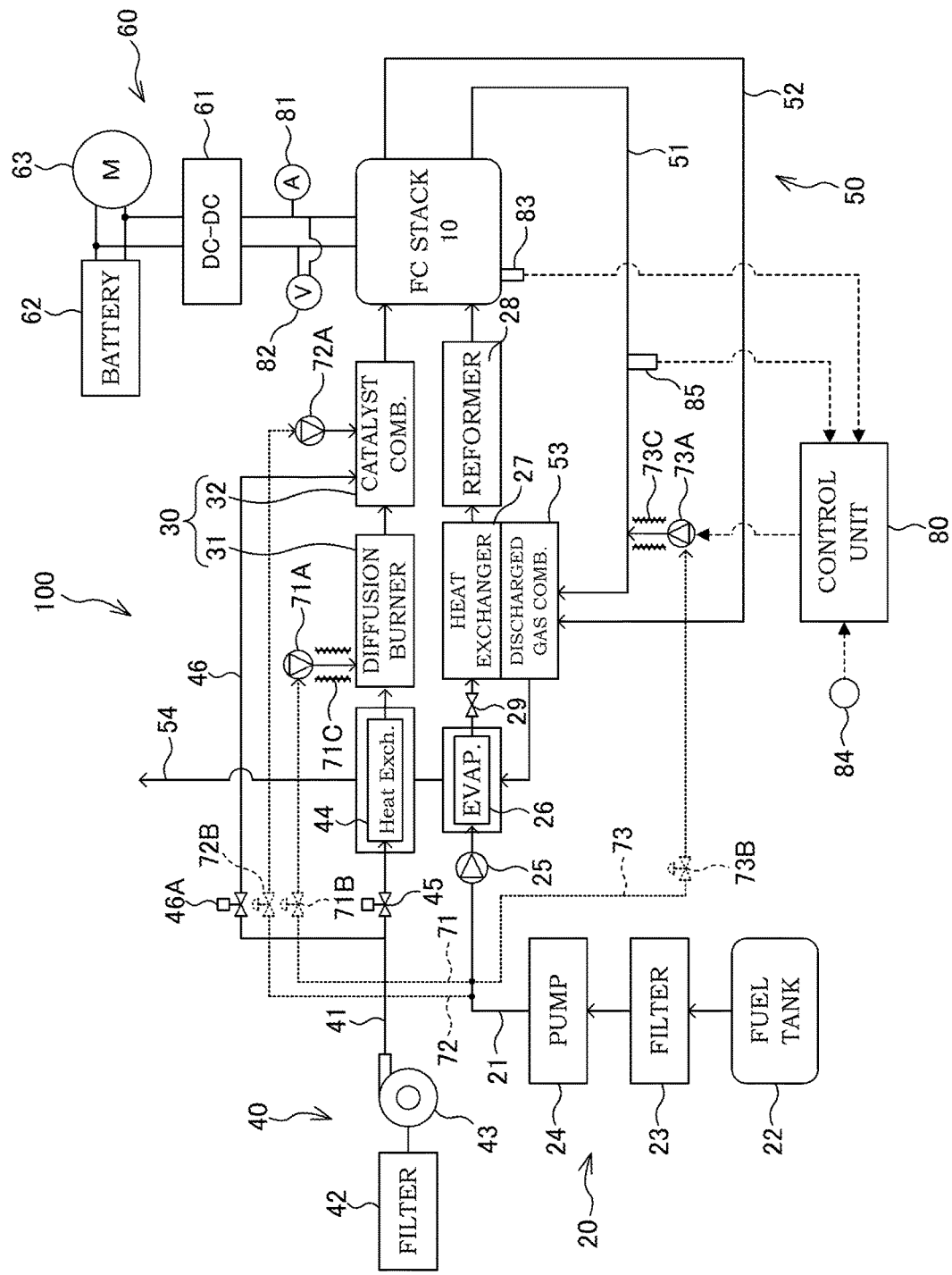
FIG. 1 is a schematic configuration diagram of a solid oxide fuel cell system according to a first embodiment of the present invention.

FIG. 1 is a schematic configuration diagram illustrating a main configuration of a solid oxide fuel cell system 100 according to a first embodiment.

As illustrated in FIG. 1, the fuel cell system 100 is a solid oxide fuel cell system including a solid oxide fuel cell stack 10 that is supplied with an anode gas and a cathode gas to generate electric power. The fuel cell system 100 constitutes a part of a power supply system for an electric vehicle or something.

The fuel cell stack 10 is a stacked cell in which a plurality of solid oxide fuel cells (SOFC) are stacked. One solid oxide fuel cell (fuel battery cell) is configured such that an electrolyte layer made of a solid oxide such as ceramic is sandwiched between an anode electrode to which an anode gas is supplied and a cathode electrode to which a cathode gas is supplied. For example, the anode gas is a gas that contains hydrogen and hydrocarbons, and a cathode gas is a gas that contains oxygen.

The fuel cell system 100 is constituted of an anode gas supply system 20, a system activation system 30, a cathode gas supply system 40, a gas discharge system 50, and an electric power system 60. The anode gas supply system 20 supplies the anode gas to the fuel cell stack 10. The system activation system 30 is used at an activation of the system.

The cathode gas supply system 40 supplies the cathode gas to the fuel cell stack 10. The gas discharge system 50 discharges an anode off-gas and a cathode off-gas discharged from the fuel cell stack 10. The electric power system 60 performs an input and output of an electric power in between with the fuel cell stack 10. Furthermore, the fuel cell system 100 includes a control unit 80 that integrally controls an operation of a whole system.

The anode gas supply system 20 includes, for example, an anode supply passage 21, a fuel tank 22, a filter 23, a pump 24, an injector 25, an evaporator 26, a heat exchanger 27, and a reformer 28.

The anode supply passage 21 is a passage that couples the fuel tank 22 to an anode flow passage formed in the fuel cell stack 10.

The fuel tank 22 is a container that stores a liquid fuel for reforming. The liquid fuel is, for example, a mixture of ethanol and water. The pump 24 is disposed in the anode supply passage 21 in a downstream side with respect to the fuel tank 22. The pump 24 suctions the fuel for reforming stored in the fuel tank 22 to supply this fuel to the injector 25 at a constant pressure.

The filter 23 is arranged in the anode supply passage 21 between the fuel tank 22 and the pump 24. The filter 23 removes, for example, foreign matters included in the fuel for reforming before being suctioned by the pump 24.

The injector 25 is arranged in the anode supply passage 21 between the pump 24 and the evaporator 26. The injector 25 injects the fuel supplied from the pump 24 into the evaporator 26.

The evaporator 26 is disposed in the anode supply passage 21 in a downstream side with respect to the injector 25. The evaporator 26 evaporates the fuel supplied from the injector 25 and supplies the fuel to the heat exchanger 27. The evaporator 26 evaporates the fuel using a heat of an exhaust gas discharged from an discharged gas combustor 53, which will be described later.

The heat exchanger 27 is disposed in the anode supply passage 21 in a downstream side with respect to the evaporator 26 and arranged so as to be adjacent to the discharged gas combustor 53. The heat exchanger 27 uses the heat transmitted from the discharged gas combustor 53 to further heat the fuel evaporated in the evaporator 26. In the anode supply passage 21 between the evaporator 26 and the heat exchanger 27, a pressure control valve 29 that adjusts a pressure of the evaporated fuel supplied to the heat exchanger 27 is disposed. An opening degree of the pressure control valve 29 is controlled by the control unit 80.

The reformer 28 is disposed in the anode supply passage 21 between the heat exchanger 27 and the fuel cell stack 10. The reformer 28 reforms the fuel using a catalyst disposed inside the reformer 28. The fuel for reforming is reformed to an anode gas containing, for example, hydrogen, hydrocarbons, and carbon monoxide by a catalyst reaction in the reformer 28. Thus reformed anode gas is, in a high temperature state, supplied to the anode flow passage of the fuel cell stack 10.

It should be noted that the anode supply passage 21 includes branch passages 71, 72, and 73 branching from this anode supply passage 21. The branch passage 71 branches from the anode supply passage 21 between the pump 24 and the injector 25 and couples to an injector 71A that supplies the fuel to a diffusion burner 31. On the branch passage 71, an open/close valve 71B that opens and closes this branch passage 71 is disposed. The branch passage 72 branches from the anode supply passage 21 between the pump 24 and the injector 25 and couples to an injector 72A that supplies the fuel to a catalyst combustor 32. On the branch passage 72, an open/close valve 72B that opens and closes this branch passage 72 is disposed. The branch passage 73 branches from the anode supply passage 21 between the pump 24 and the injector 25 and couples to an injector 73A that supplies the fuel to an anode discharge passage 51. On the branch passage 73, an open/close valve 73B that opens and closes this branch passage 73 is disposed. The injectors 71A and 73A include an electric heater 71C and 73C, respectively as heating devices to evaporate the liquid fuel.

Opening degrees of the above-described open/close valves 71B, 72B, and 73B are controlled by the control unit 80. The open/close valves 71B and 72B are opened during the activation of the fuel cell system 100 and closed after the activation is terminated. The open/close valve 73B is opened when the fuel cell system 100 is stopped and closed during the system activation and during a normal operation.

Next, with reference to FIG. 1, the cathode gas supply system 40 and the system activation system 30 will be described.

The cathode gas supply system 40 includes, for example, a cathode supply passage 41, a filter 42, a compressor 43, and a heat exchanger 44. The system activation system 30 includes, for example, the diffusion burner 31 and the catalyst combustor 32.

The cathode supply passage 41 is a passage that couples the compressor 43 to a cathode flow passage formed in the fuel cell stack 10.

The compressor 43 is an air supply device that takes in an outside air through the filter 42 to supply the taken-in air to the fuel cell stack 10 as the cathode gas. The filter 42 removes a foreign matter included in the air before being taken in to the compressor 43.

The heat exchanger 44 is disposed in the cathode supply passage 41 in a downstream side with respect to the compressor 43. The heat exchanger 44 is a device that heats the cathode gas (air) using the heat of the exhaust gas discharged from the discharged gas combustor 53. The cathode gas heated by the heat exchanger 44 is supplied to the diffusion burner 31 that constitutes a part of the system activation system 30.

In the cathode supply passage 41 between the compressor 43 and the heat exchanger 44, a throttle 45 (flow rate adjustment unit) is disposed. A flow rate of the cathode gas is adjusted corresponding to an opening degree of the throttle 45. The opening degree of the throttle 45 is controlled by the control unit 80.

It should be noted that the cathode supply passage 41 includes a branch passage 46 that branches from this cathode supply passage 41. The branch passage 46 branches from the cathode supply passage 41 between the compressor 43 and the throttle 45 and couples to the catalyst combustor 32, which will be described later. In the branch passage 46, a throttle 46A is mounted and an air flow rate is adjusted corresponding to the opening degree of the throttle 46A. The opening degree of the throttle 46A is controlled by the control unit 80. The throttle 46A is opened so as to supply a constant amount of air to the catalyst combustor 32 during the activation of the fuel cell system 100 and is closed after the activation is terminated.

The diffusion burner 31 and the catalyst combustor 32 that constitute the system activation system 30 are devices basically used during the system activation (start).

The diffusion burner 31 is arranged in the cathode supply passage 41 in a downstream side with respect to the heat exchanger 44. At the system activation (start), the air from the compressor 43 and the fuel injected from the injector 71A are supplied into the diffusion burner 31. The fuel injected from the injector 71A is heated by the electric heater 71C and supplied to the diffusion burner 31 in an evaporated state. Then, an ignition device attached to the diffusion burner 31 ignites an air-fuel mixture to form a preheating burner to heat the catalyst combustor 32.

After the activation is terminated, the fuel supply and the operation of the ignition device are stopped, and the air supplied from the compressor 43 is supplied to the catalyst combustor 32 through the diffusion burner 31.

The catalyst combustor 32 is disposed in the cathode supply passage 41 between the diffusion burner 31 and the fuel cell stack 10. The catalyst combustor 32 internally includes a catalyst and is a device to generate a combustion gas using this catalyst. At the system activation, the air from the branch passage 46 and the fuel injected from the injector 72A are supplied into the catalyst combustor 32. The catalyst of the catalyst combustor 32 is heated by the preheating burner and the air and the fuel combust on the heated catalyst to generate the combustion gas. The combustion gas is an inert gas in a high temperature that hardly includes any oxygen and is supplied to the fuel cell stack 10 to heat the fuel cell stack 10 and so on.

After the activation is terminated, the supplies of the fuel and the air from the branch passages 72 and 46 are stopped, and the air (anode gas) from the compressor 43 is supplied to the fuel cell stack 10 through the diffusion burner 31 and the catalyst combustor 32.

Next, the gas discharge system 50 will be described. The gas discharge system 50 includes, for example, the anode discharge passage 51, a cathode discharge passage 52, the discharged gas combustor 53, and a joined discharge passage 54.

The anode discharge passage 51 couples the anode flow passage of the fuel cell stack 10 to an anode side inlet portion of the discharged gas combustor 53. The anode discharge passage 51 is a passage through which the discharged gas (anode off-gas) containing the anode gas discharged from the anode flow passage of the fuel cell stack 10 flows.

The cathode discharge passage 52 couples the cathode flow passage of the fuel cell stack 10 to a cathode side inlet portion of the discharged gas combustor 53. The cathode discharge passage 52 is a passage through which the discharged gas (cathode off-gas) containing the cathode gas discharged from the cathode flow passage of the fuel cell stack 10 flows.

The discharged gas combustor 53 catalytically combusts the anode off-gas and the cathode off-gas supplied from the respective discharge passages 51 and 52 to generate a exhaust gas mainly including carbon dioxide and water. In order to cause the catalyst of the discharged gas combustor 53 to function, it is preferred that the catalyst temperature is equal to or more than an activation temperature. Accordingly, for example, at the system activation, the catalyst of the discharged gas combustor 53 is heated by the combustion gas generated in the catalyst combustor 32. It should be noted that, at the system activation, a temperature rise efficiency of a catalyst temperature may be enhanced by supplying the fuel and the air to the discharged gas combustor 53 to accelerate the catalytic combustion in the discharged gas combustor 53.

Since the discharged gas combustor 53 is disposed so as to be adjacent to the heat exchanger 27, a heat caused by the catalytic combustion in the discharged gas combustor 53 is transmitted to the heat exchanger 27. The heat transmitted to the heat exchanger 27 is used to heat the fuel.

The discharged gas combustor 53 has a gas outlet portion (a downstream end) coupled to the joined discharge passage 54. The exhaust gas discharged from the discharged gas combustor 53 is discharged outside the fuel cell system 100 passing through the joined discharge passage 54. The joined discharge passage 54 is configured so as to pass through the evaporator 26 and the heat exchanger 44, and the evaporator 26 and the heat exchanger 44 are heated by the exhaust gas passing through the joined discharge passage 54.

The discharged gas combustor 53 and the joined discharge passage 54 described above function as a joining portion through which a gas discharged from the fuel cell stack 10 is collectively flown.

Next, the electric power system 60 will be described. The electric power system 60 includes, for example, a DC-DC converter 61, a battery 62, and a drive motor 63.

The DC-DC converter 61 is electrically coupled to the fuel cell stack 10, and boosts an output voltage of the fuel cell stack 10 to supply electric power to the battery 62 or the drive motor 63. The battery 62 is configured to charge the electric power supplied from the DC-DC converter 61 and supply the electric power to the drive motor 63.

The drive motor 63 is a three-phase AC motor and functions as a power source of a vehicle. The drive motor 63 is coupled to the battery 62 and the DC-DC converter 61 via an inverter. On braking, the drive motor 63 generates regenerative electric power. This regenerative electric power is used for charging the battery 62, for example.

The control unit 80 is constituted of a microcomputer including a central processing unit (CPU), a read-only memory (ROM), a random access memory (RAM), and an input/output interface (I/O interface). The control unit 80 executes specific programs to execute processings for controlling the fuel cell system 100.

The control unit 80 receives signals from sensors configured to detect a vehicle conditions, such as an accelerator stroke sensor 84 detecting a depression amount of an accelerator pedal, in addition to signals from various kinds of sensors, such as a current sensor 81, a voltage sensor 82, and a temperature sensor 83.

The current sensor 81 detects an output current taken out of the fuel cell stack 10. The voltage sensor 82 detects an output voltage of the fuel cell stack 10, that is, an inter-terminal voltage between an anode electrode side terminal and a cathode electrode side terminal. The temperature sensor 83 is disposed in the fuel cell stack 10 and detects or estimates a temperature of this fuel cell stack 10.

In the above-described solid oxide fuel cell system 100, the system stop control is executed in response to, for example, the system stop request based on a key-off operation by a driver. In the fuel cell system 100, since the operation temperature of the fuel cell stack 10 is high, the cooling processing of the fuel cell stack 10 is executed in the system stop control before the operation of the fuel cell system 100 is completely stopped. It should be noted that the fuel cell system 100 is configured to charge the battery 62 with the electric power generated in the fuel cell stack 10, and the system stop control may be executed when the battery 62 is fully charged. The system stop control is a control executed during the system stop, and is terminated as soon as, for example, the temperature of the fuel cell stack 10 reaches the temperature at which the oxidative degradation of the anode electrode can be reduced or prevented. On the other hand, "during the system stop" means a period from a start of the system stop control to the next system activation.

The cooling processing is executed by stopping the supply of the anode gas while the supply of the cathode gas is continued. The fuel cell stack 10 is cooled by the cathode gas. During the cooling processing, the cathode gas (air) is continued to be supplied to the fuel cell stack 10, the air as the cathode off-gas that has passed through the fuel cell stack 10 flows into the discharged gas combustor 53 through the cathode discharge passage 52.

Since the supply of the anode gas is stopped while the fuel cell stack 10 is cooled, a part of the cathode gas that has reached the discharged gas combustor 53 (joining portion) flows into the anode discharge passage 51 from this discharged gas combustor 53. As soon as the gas containing oxygen flows backward into the anode discharge passage 51, the oxygen concentration in the anode discharge passage 51 and the anode flow passage in the fuel cell stack 10 increases. In a state where the oxygen concentration in the anode flow passage is high and the fuel cell stack 10 is not sufficiently cooled, there is a possibility of the oxidative degradation of the anode electrode of the fuel cell stack 10. For example, in the fuel cell of the solid oxide type, when the anode electrode is constituted of metal, such as nickel, oxygen in the anode gas oxidizes and turns nickel (Ni) into NiO. At this time, a volume possibly expands to cause a crack in the anode electrode and an electrolyte.

Therefore, in the fuel cell system 100 according to the embodiment, the oxidative degradation of the anode electrode is reduced by reducing the increase of the oxygen concentration in the anode discharge passage 51 while the fuel cell stack 10 is cooled.

Figure 2:
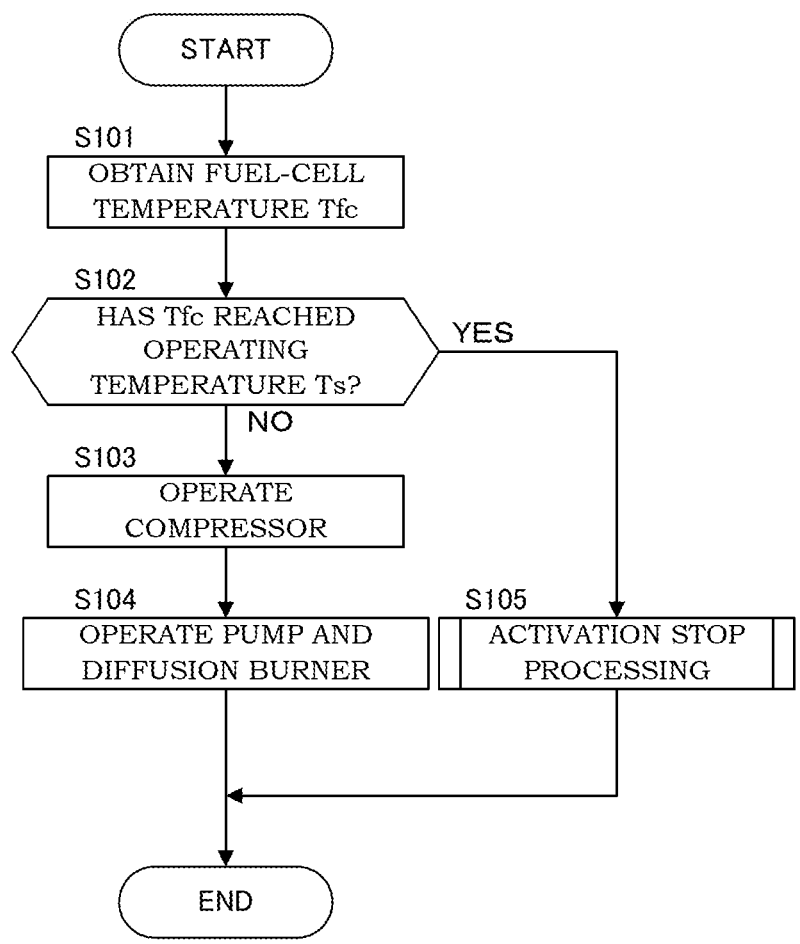
FIG. 2 is a flowchart illustrating a system activation control of the solid oxide fuel cell system according to the first embodiment.
Figure 3:
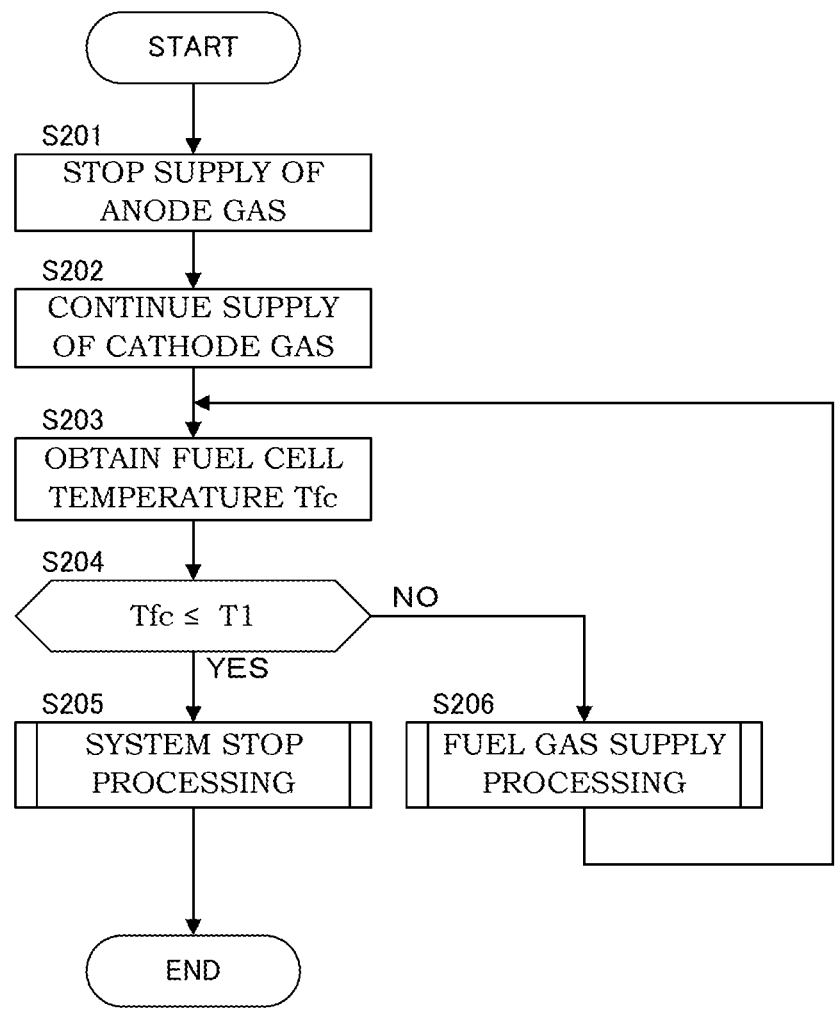
FIG. 3 is a flowchart illustrating a system stop control of the solid oxide fuel cell system according to the first embodiment.

The following describes, first, a system activation control of the fuel cell system 100 with reference to FIG. 2, and then describes the system stop control of the fuel cell system 100 with reference to FIG. 3. The cooling processing of the fuel cell stack 10 is a processing executed during the system stop control.

FIG. 2 is a flowchart illustrating the system activation control executed by the control unit 80 of the fuel cell system 100. The system activation control is repeatedly executed after an activation request (activation request, such as a key-on operation by a driver) to the fuel cell system 100.

As illustrated in FIG. 2, after a start of the system activation control, the control unit 80 executes the processing of Step 101 (S101). At S101, the control unit 80 obtains a temperature of the fuel cell stack 10 (fuel cell temperature Tfc) using the temperature sensor 83.

At S102, the control unit 80 determines whether the fuel cell temperature Tfc has reached a preliminarily-set operating temperature Ts or not. The operating temperature Ts is set as a temperature at which the electric power can be generated with predetermined power generation efficiency or more in the fuel cell stack 10.

When the fuel cell temperature Tfc is lower than the operating temperature Ts, the control unit 80 determines that there is a necessity of warming up the fuel cell stack 10 and executes the processings of S103 and S104.

At S103, the control unit 80 drives the compressor 43 and opens the throttles 45 and 46A at respective constant opening degrees. This supplies an air to the diffusion burner 31 and the catalyst combustor 32.

After the processing of S103, the control unit 80 activates the pump 24 and the ignition device of the diffusion burner 31 and opens the open/close valves 71B and 72B at S104. This supplies the liquid fuel stored in the fuel tank 22 to the diffusion burner 31 and the catalyst combustor 32. Then, the preheating burner is formed in the diffusion burner 31, and a combustion gas is generated in the catalyst combustor 32 using this preheating burner. This combustion gas warms up the fuel cell stack 10 and the equipment disposed in a downstream with respect to this fuel cell stack 10.

On the other hand, when it is determined that the fuel cell temperature Tfc has reached the operating temperature Ts at S102, the control unit 80 determines that the fuel cell stack 10 is warmed up, and executes an activation stop processing of S105.

At S105, the control unit 80 stops the ignition device of the diffusion burner 31, closes the throttle 46A and the open/close valves 71B and 72B, and terminates the system activation control.

After the system activation control is terminated, the control unit 80 executes a usual electric generation control. During the usual electric generation control, the fuel supplied from the fuel tank 22 is evaporated by the evaporator 26, and the evaporated fuel is heated by the heat exchanger 27. The heated fuel is reformed to the anode gas in the reformer 28, and the anode gas is supplied to the fuel cell stack 10. On the other hand, a temperature of the air (cathode gas) supplied by the compressor 43 is increased by the heat exchanger 44, and the air is supplied to the fuel cell stack 10 via the diffusion burner 31 and the catalyst combustor 32. The fuel cell stack 10 configured to receive the supply of the anode gas and the cathode gas to generate the electric power, and the generated electric power of the fuel cell stack 10 is used in, for example, the battery 62 and the drive motor 63.

It should be noted that the anode off-gas and the cathode off-gas discharged from the fuel cell stack 10 are introduced into the discharged gas combustor 53 through the anode discharge passage 51 and the cathode discharge passage 52. In the discharged gas combustor 53, the anode off-gas and the cathode off-gas are combusted to be a exhaust gas, and the exhaust gas discharged from the discharged gas combustor 53 heats the evaporator 26 and the heat exchanger 44.

Next, with reference to FIG. 3, the system stop control of the fuel cell system 100 will be described. FIG. 3 is a flowchart illustrating the system stop control executed by the control unit 80. The system stop control is executed after a stop request (stop request, such as a key-off operation by a driver) to the fuel cell system 100.

As illustrated in FIG. 3, after the start of the system stop control, the control unit 80 executes the processing of S201. At S201, the control unit 80 stops the operation of the pump 24, and causes the pressure control valve 29 to be in a fully closed state. This stops the supply of the anode gas to the fuel cell stack 10.

At S202, the control unit 80 increases a rotation speed of the compressor 43 more than that during the usual electric generation and controls the opening degree of the throttle 45 to be, for example, the opening degree during the fuel cell cooling so as to cause the supply amount of the cathode gas to be more than that during the usual electric generation. For example, the rotation speed of the compressor 43 and the opening degree of the throttle 45 are set larger than those during the usual electric generation in which the fuel cell stack 10 generates the electric power to generate a requested output determined by a system operating state. Thus, continuously supplying the cathode gas to the fuel cell stack 10 and using the cathode gas as a cooling gas cools the fuel cell stack 10 from the inside. The processings of S201 and S202 correspond to the cooling processing that forcibly cools the fuel cell stack 10.

At S203, the control unit 80 obtains the fuel cell temperature Tfc using the temperature sensor 83, and then executes the processing of S204.

At S204, the control unit 80 determines whether the fuel cell temperature Tfc has decreased down to a preliminarily-set reference temperature T1 or not. The reference temperature T1 is, for example, 300° C., and is set as a temperature at which the anode electrode of the fuel cell is not oxidized and degraded even when oxygen is present in the anode discharge passage 51. The reference temperature T1 is arbitrarily set to any value corresponding to, for example, a constituent material of the anode electrode.

When the fuel cell temperature Tfc is at the reference temperature T1 or less, the control unit 80 determines that the fuel cell stack 10 is sufficiently cooled so as not to cause the oxidative degradation of the anode electrode, and executes the system stop processing of S205. In the system stop processing, the control unit 80 stops the compressor 43 and causes the throttle 45 to be in a fully closed state. This stops the supply of the anode gas and the cathode gas and terminates the stop control of the fuel cell system 100.

On the other hand, when the fuel cell temperature Tfc is larger than the reference temperature T1, the control unit 80 determines that there is a possibility of the oxidative degradation of the anode electrode, and executes a fuel gas supply processing of S206.

At S206, the control unit 80 opens the open/close valve 73B, drives the injector 73A to supply the fuel gas evaporated by the electric heater 73C to the anode discharge passage 51. The injector 73A is configured as a gas supply unit different from the anode gas supply unit (such as the reformer 28) that supplies the anode gas to the fuel cell stack 10. Thus, during the system stop control (during the fuel cell stack cooling), supplying the fuel stored in the fuel tank 22 to the anode discharge passage 51 by the injector 73A reduces the increase of the oxygen concentration in the anode discharge passage 51.

Figure 4:
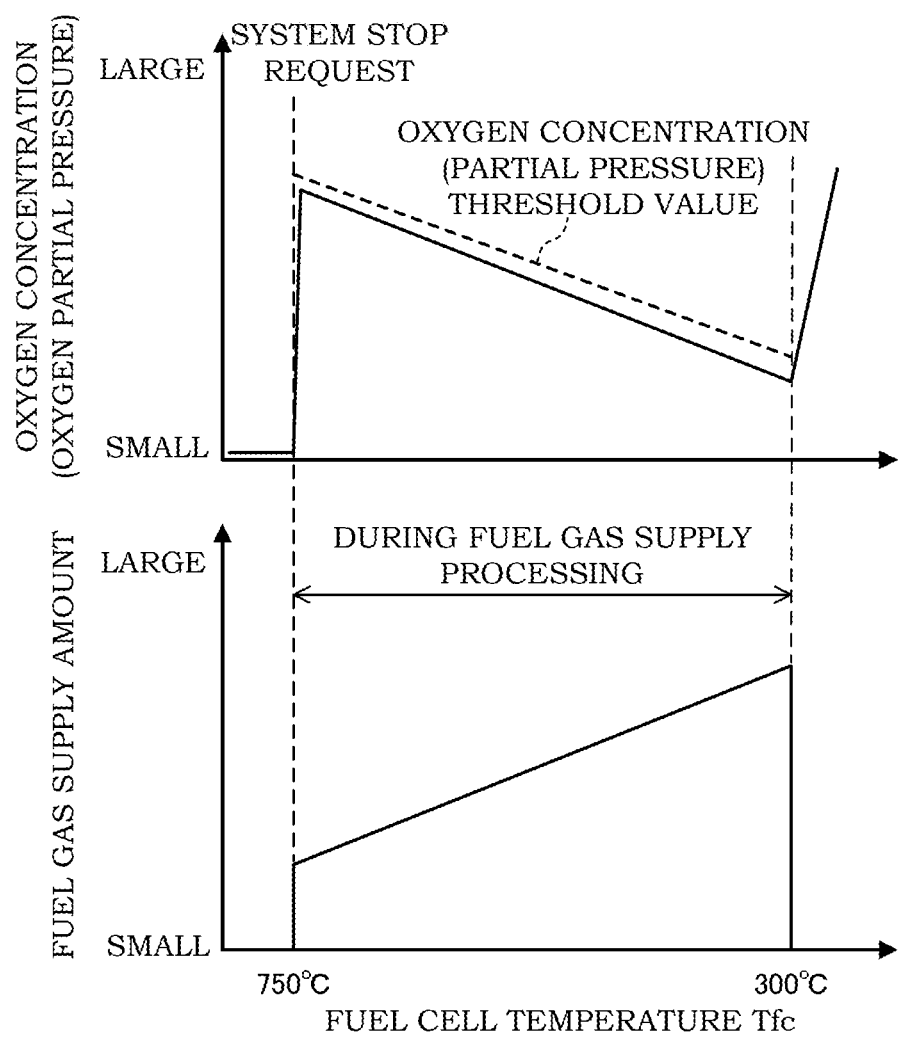
FIG. 4 is a drawing describing a change in a fuel gas supply amount and a change in an oxygen concentration in an anode discharge passage during the system stop control.

This fuel gas supply control will be described with reference to FIG. 4. FIG. 4 is a drawing describing a change in a fuel gas supply amount and a change in the oxygen concentration in the anode discharge passage 51 during the system stop control.

As soon as the system stop control is started, the supply of the anode gas is stopped and only the cathode gas is supplied to the fuel cell stack 10. The fuel cell stack 10 is cooled by the cathode gas. The cathode gas passed through the fuel cell stack 10 is introduced as the cathode off-gas into the discharged gas combustor 53 through the cathode discharge passage 52. A part of the introduced cathode off-gas flows into the anode discharge passage 51 from the discharged gas combustor 53. Accordingly, as illustrated in FIG. 4, the oxygen concentration in the anode discharge passage 51 increases at a time point where the system stop control is started.

At the starting time point of the system stop control, the fuel cell stack 10 is hardly cooled and the fuel cell temperature Tfc is at a high temperature (such as 750° C.). When the oxygen concentration in the anode discharge passage 51 becomes larger than an oxygen concentration threshold value (reference concentration) in a state where the fuel cell temperature is high, the anode electrode of the fuel cell is oxidized and degraded.

However, in the fuel cell system 100, when the fuel cell temperature Tfc after the start of the system stop control is higher than the reference temperature (such as 300° C.), the fuel gas is supplied to the anode discharge passage 51 via the injector 73A. Thus, supplying the fuel gas to the anode discharge passage 51 causes the cathode gas to hardly flow into a side of the anode discharge passage 51 from the discharged gas combustor 53 due to the presence of the fuel gas in the anode discharge passage 51, thereby reducing the increase of the oxygen concentration in the anode discharge passage 51. Accordingly, the oxygen concentration in the anode discharge passage 51 can be reduced from exceeding the oxygen concentration threshold value (reference concentration). It should be noted that the oxygen concentration in the anode discharge passage 51 is in a proportional relation with the oxygen partial pressure in the anode discharge passage 51; therefore, the oxygen partial pressure may be an index regarding the oxidative degradation of the anode electrode instead of the oxygen concentration.

The present inventors have found that, regarding the oxidative degradation of the anode electrode of the fuel cell, the oxygen concentration with which the oxidative degradation can occur changes depending on the fuel cell temperature Tfc. That is, as illustrated in FIG. 4, the oxygen concentration threshold value (reference concentration) as a threshold value of presence/absence of the oxidative degradation occurrence decreases as the fuel cell temperature Tfc decreases. The reason why the oxygen concentration threshold value with which the oxidative degradation occurs decreases as the fuel cell temperature Tfc decreases is that the hydrogen in the anode electrode is easily emitted as the fuel cell temperature Tfc decreases; therefore, in association with it, the oxygen is more likely to be diffused in the anode electrode. However, when the fuel cell temperature Tfc decreases down to a certain extent (such as 300° C.), the anode electrode is no longer subject to the oxidative degradation irrespective of the oxygen concentration.

On the basis of such a finding, in the fuel cell system 100, the supply amount of the fuel gas supplied to the anode discharge passage 51 is increased as the fuel cell temperature Tfc decreases. In view of this, the oxygen concentration in the anode discharge passage 51 can be decreased corresponding to the decrease of the fuel cell temperature Tfc as illustrated in FIG. 4, thereby ensuring reducing the oxidative degradation of the anode electrode irrespective of the fuel cell temperature Tfc.

Accordingly, the supply amount of the fuel gas introduced from the injector 73A to the anode discharge passage 51 is determined on the basis of the fuel cell temperature Tfc. The oxygen concentration threshold value can be determined as long as the fuel cell temperature Tfc is known. With this oxygen concentration threshold value and, for example, a volume (already-known parameter) of the anode discharge passage and the anode flow passage in the fuel cell stack 10, the supply amount of the fuel gas with which the oxygen concentration in the anode discharge passage 51 does not exceed the oxygen concentration threshold value can be determined. The control unit 80 adjusts the fuel gas supply amount supplied from the injector 73A by controlling an injection period or an opening amount of the injector 73A.

It should be noted that, in the fuel cell system 100, since the oxidative degradation of the anode electrode does not occur when the fuel cell temperature Tfc decreases down to the reference temperature (such as 300° C.) by the cooling process during the system stop control, the fuel gas supply processing is stopped and the system stop processing to completely stop the fuel cell system 100 is executed.

With the above-described fuel cell system 100, the following effect can be provided.

The fuel cell system 100 includes the fuel cell stack 10 of the solid oxide type, which is configured to receive the supply of the anode gas and the cathode gas to generate the electric power, the anode discharge passage 51 in which the anode off-gas discharged from the fuel cell stack 10 flows, the cathode discharge passage 52 in which the cathode off-gas discharged from the fuel cell stack 10 flows, and the discharged gas combustor 53 as a joining portion where the anode discharge passage 51 and the cathode discharge passage 52 join. Furthermore, the fuel cell system 100 includes the injector 73A as a gas supply unit that supplies the fuel gas using the fuel stored in the fuel tank 22 into the anode discharge passage 51 during the system stop (during the system stop control). The injector 73A is configured as the gas supply unit different from the anode gas supply unit (such as the reformer 28) supplying the anode gas to the fuel cell stack 10.

In the fuel cell system 100 thus configured, supplying the fuel gas to the anode discharge passage 51 by the injector 73A using the fuel stored in the fuel tank 22 during the system stop causes the cathode gas to hardly flow into the anode discharge passage 51 from the discharged gas combustor 53, thereby reducing the increase of the oxygen concentration (oxygen partial pressure) in the anode discharge passage 51. This ensures reducing the oxidative degradation of the anode electrode of the fuel cell.

The fuel cell system 100 includes the temperature sensor 83 as a temperature-sensing unit that detects or estimates the temperature of the fuel cell stack 10. The injector 73A supplies the fuel gas to the anode discharge passage 51 when the fuel cell temperature Tfc is higher than the reference temperature T1 during the system stop. When the fuel cell stack 10 is in a temperature state where there is a possibility of the oxidative degradation of the anode electrode, the fuel gas is supplied to the anode discharge passage 51 to reduce the increase of the oxygen concentration (oxygen partial pressure) in the anode discharge passage 51; therefore, without wastefully consuming the fuel, the oxidative degradation of the anode electrode of the fuel cell can be reduced.

Furthermore, in the fuel cell stack 10, the injector 73A is configured such that the fuel gas supply amount is increased as the fuel cell temperature Tfc decreases. This ensures decreasing the oxygen concentration (oxygen partial pressure) in the anode discharge passage 51 corresponding to the decrease in the fuel cell temperature Tfc, thereby ensuring efficiently reducing the oxidative degradation of the anode electrode with the fuel gas supply amount corresponding to the fuel cell temperature Tfc.

The injector 73A of the fuel cell stack 10 includes the electric heater 73C as a heating apparatus that evaporates the fuel supplied from the fuel tank 22 and is configured to supply the evaporated fuel to the anode discharge passage 51 as the fuel gas. Thus using the electric heater 73C ensures supplying the fuel gas, which is surely evaporated, to the anode discharge passage 51, thereby ensuring efficiently reducing the increase of the oxygen concentration (oxygen partial pressure) in the anode discharge passage 51.

Next, with reference to FIG. 1 and FIG. 5, the fuel cell system 100 according to a modification of the first embodiment will be described.

In the fuel cell system 100 according to the modification, the oxygen concentration in the anode discharge passage 51 is detected and the fuel gas supply processing is executed using the oxygen concentration. Accordingly, as illustrated in FIG. 1, the fuel cell system 100 includes an oxygen concentration sensor 85 as an oxygen concentration detecting unit that detects or estimates the oxygen concentration in the anode discharge passage 51.

The oxygen concentration sensor 85 is disposed in the anode discharge passage 51 in an upstream side with respect to an installation position of the injector 73A. The oxygen concentration sensor 85 is enough to be disposed in the anode discharge passage 51 and preferred to be disposed in a position closer to the fuel cell stack 10 with respect to the injector 73A. For the oxygen concentration sensor 85, for example, a zirconia oxygen analyzer, which detects or estimates the oxygen concentration using a solid electrolyte zirconia element, is used. The oxygen concentration sensor 85 is electrically coupled to the control unit 80 and the detection signal of the oxygen concentration sensor 85 is provided to the control unit 80. The control unit 80 is also capable of calculating the oxygen partial pressure in the anode discharge passage 51 on the basis of the oxygen concentration detected or estimated by the oxygen concentration sensor 85.

Next, with reference to FIG. 5, the system stop control executed by the control unit 80 of the fuel cell system 100 according to the modification will be described. FIG. 5 is a flowchart illustrating the system stop control executed by the control unit 80 of the fuel cell system 100 according to the modification.

Figure 5:
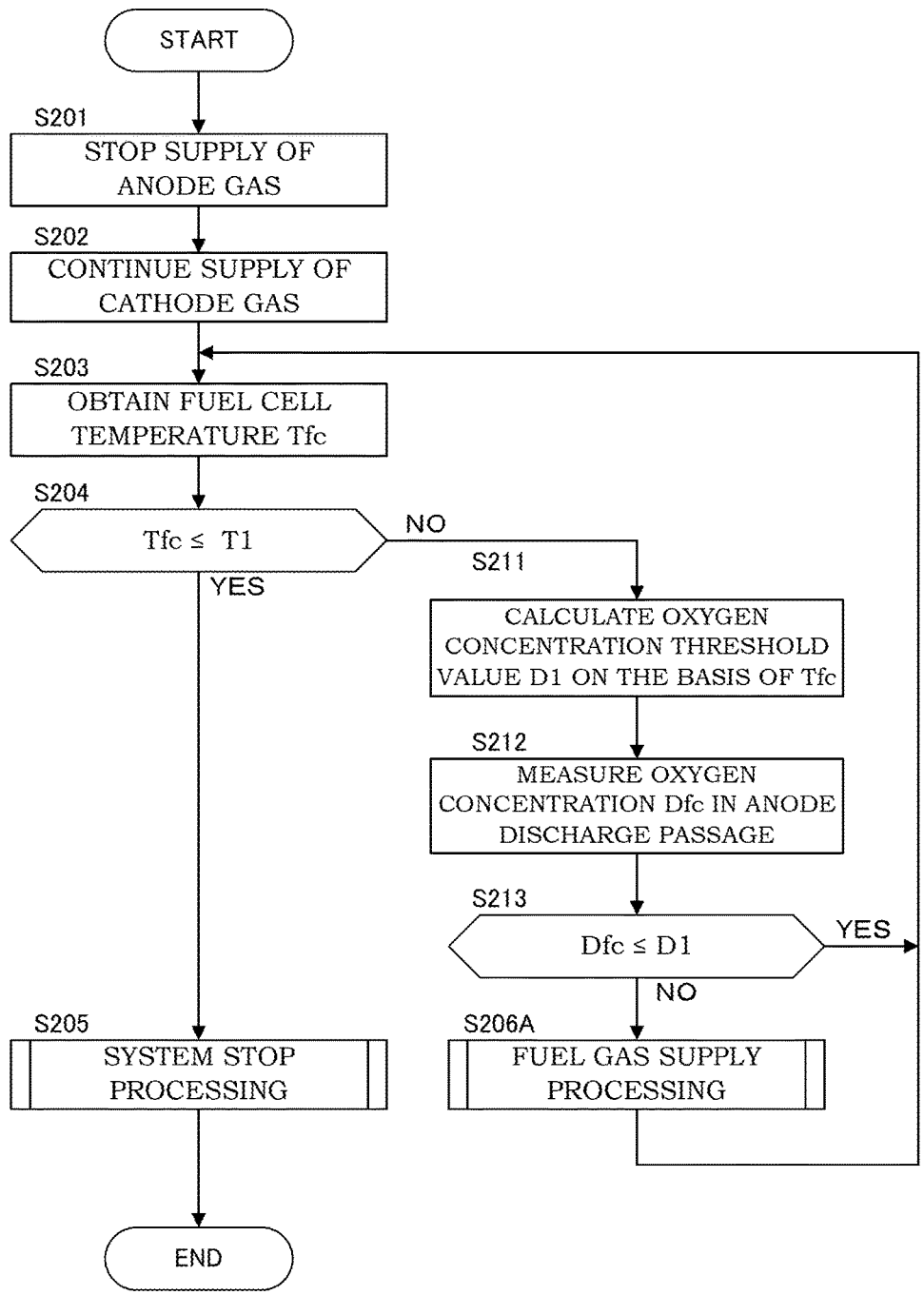
FIG. 5 is a flowchart illustrating the system stop control of the solid oxide fuel cell system according to one modification of the first embodiment.

Since the processings of S201 to S205 in FIG. 5 are processings identical to those of S201 to S205 in FIG. 3, the description of these processings is omitted. Other processings of S211 to 213 and S206A will be described in details.

As illustrated in FIG. 5, when it is determined that the fuel cell temperature Tfc is larger than the reference temperature T1 at S204, the control unit 80 executes the processings at and after S211.

At S211, the control unit 80 calculates a threshold value D1 of the oxygen concentration in the anode discharge passage 51 on the basis of the fuel cell temperature Tfc detected or estimated by the temperature sensor 83.

As the dashed line in FIG. 4 indicates, a map (characteristic line) showing a relation between the fuel cell temperature Tfc and the oxygen concentration threshold value D1 has been obtained from, for example, a preliminary experiment, and this map is stored in, for example, the ROM in the control unit 80. Accordingly, the control unit 80 can unambiguously calculate the oxygen concentration threshold value D1 corresponding to the fuel cell temperature Tfc on the basis of the fuel cell temperature Tfc. It should be noted that the control unit 80 calculates (sets) the oxygen concentration threshold value D1 to a small value as the fuel cell temperature Tfc decreases.

At S212, the control unit 80 measures an oxygen concentration Dfc in the anode discharge passage 51 using the oxygen concentration sensor 85, and then executes the processing of S213.

At S213, the control unit 80 compares the oxygen concentration Dfc with the oxygen concentration threshold value D1 (reference concentration) calculated at S211 to determine whether the oxygen concentration Dfc is equal to or less than the oxygen concentration threshold value D1.

When the oxygen concentration Dfc in the anode discharge passage 51 is equal to or less than the oxygen concentration threshold value D1, the control unit 80 determines that the oxygen concentration Dfc is so low that there is no possibility of the oxidative degradation of the anode electrode, and executes the processing of S203 again. In contrast to this, when the oxygen concentration Dfc in the anode discharge passage 51 is larger than the oxygen concentration threshold value D1, the control unit 80 determines that there is a possibility of the oxidative degradation of the anode electrode, and executes the fuel gas supply processing of S206A.

At S206A, the control unit 80 opens the open/close valve 73B and drives the injector 73A to supply the fuel gas evaporated by the electric heater 73C to the anode discharge passage 51. Thus supplying the fuel stored in the fuel tank 22 to the anode discharge passage 51 by the injector 73A during the system stop control (during the fuel cell stack cooling) reduces the increase of the oxygen concentration in the anode discharge passage 51. It should be noted that the control unit 80 executes the processing at and after S203 again after the fuel gas supply processing of S206A is terminated.

In the fuel cell system 100 according to the modification, the injector 73A is configured to supply the fuel gas to the anode discharge passage 51 when the fuel cell temperature Tfc is higher than the reference temperature T1 and the oxygen concentration Dfc is higher than the oxygen concentration threshold value D1 (reference concentration). That is, the fuel gas is not supplied as long as the oxygen concentration Dfc in the anode discharge passage 51 is in a concentration with which the oxidative degradation of the anode electrode is not caused even when the fuel cell temperature Tfc is higher than the reference temperature T1.

Thus, unlike the case of the first embodiment, the control unit 80 controls the injector 73A so as to supply the fuel gas to the anode discharge passage 51 when the oxygen concentration Dfc exceeds the oxygen concentration threshold value D1. Such a fuel gas supply processing ensures reducing the oxidative degradation of the anode electrode of the fuel cell while a fuel consumption is reduced compared with the first embodiment.

In the fuel cell system 100 according to the modification, the control unit 80 controls the injector 73A so as to increase the fuel gas supply amount as a deviation between the oxygen concentration Dfc and the oxygen concentration threshold value D1 increases. That is, the injector 73A is configured so as to adjust the supply amount of the fuel gas corresponding to the oxygen concentration Dfc. More specifically, the injector 73A is configured so as to increase the supply amount of the fuel gas as a value calculated by subtracting the oxygen concentration threshold value D1 from the oxygen concentration Dfc increases.

Thus, the fuel gas is supplied corresponding to a deviation amount between the oxygen concentration Dfc in the anode discharge passage 51 and the oxygen concentration threshold value D1; therefore, without wastefully consuming the fuel, the oxygen concentration in the anode discharge passage 51 can be surely decreased. Accordingly, the oxidative degradation of the anode electrode can be efficiently reduced with the fuel gas supply amount corresponding to the oxygen concentration Dfc in the anode discharge passage 51.

It should be noted that, in consideration of the fact that the oxidative degradation of the anode easily occurs as the fuel cell temperature Tfc decreases when the fuel cell temperature Tfc is larger than the reference temperature T1 (such as 300° C.), the control unit 80 sets the oxygen concentration threshold value D1 to a small value as the fuel cell temperature Tfc decreases. This ensures controlling the fuel gas supply amount by taking the relation between the fuel cell temperature and the oxygen concentration into account to make it possible to surely reduce the oxidative degradation of the anode electrode with a minimum necessary fuel gas supply amount.

Second Embodiment

Figure 6:
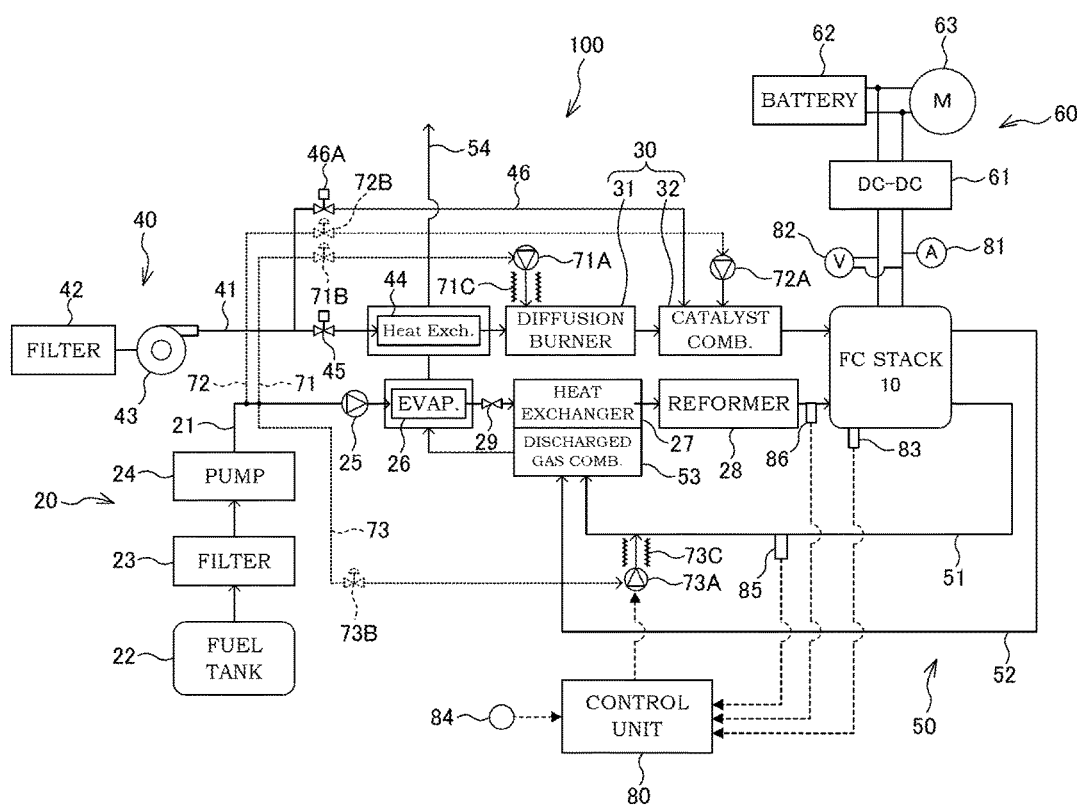
FIG. 6 is schematic configuration diagram of a solid oxide fuel cell system according to a second embodiment of the present invention.
Figure 7:
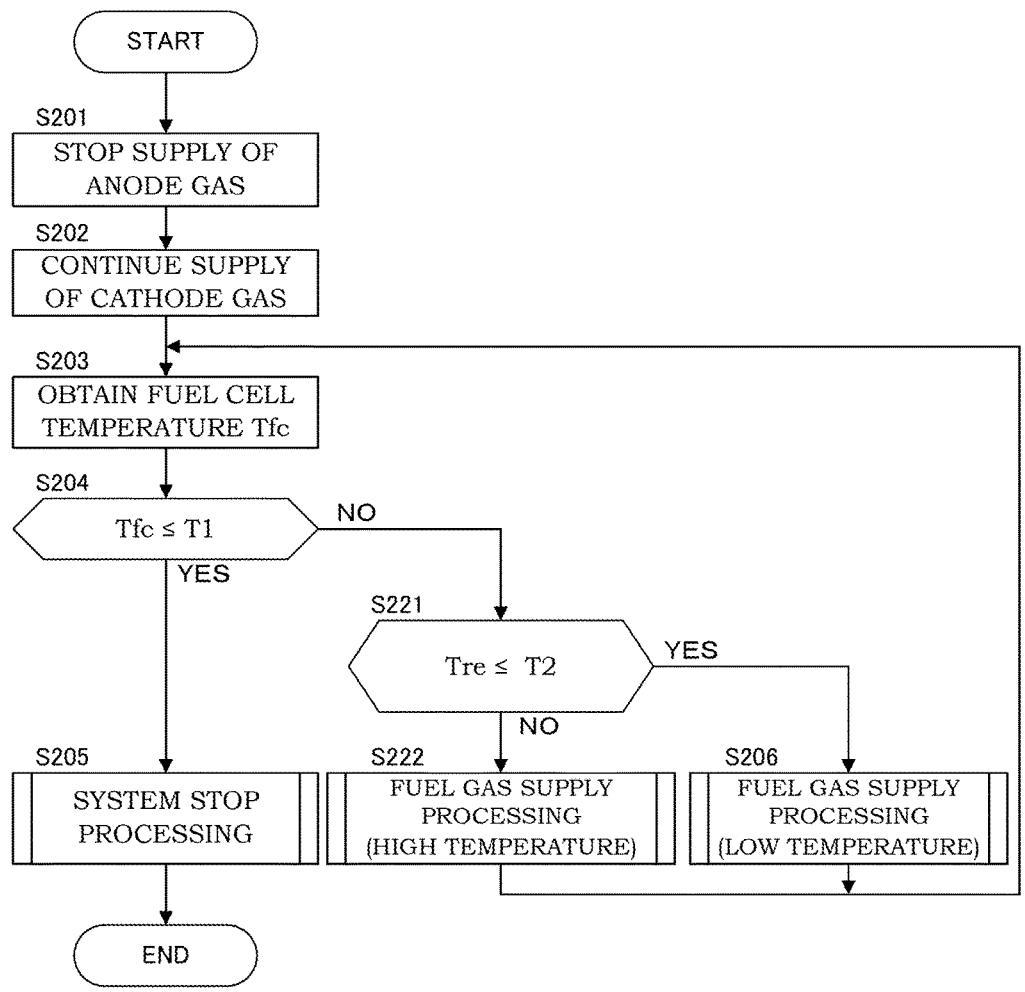
FIG. 7 is a flowchart illustrating a system stop control of the solid oxide fuel cell system according to the second embodiment.
Figure 8:
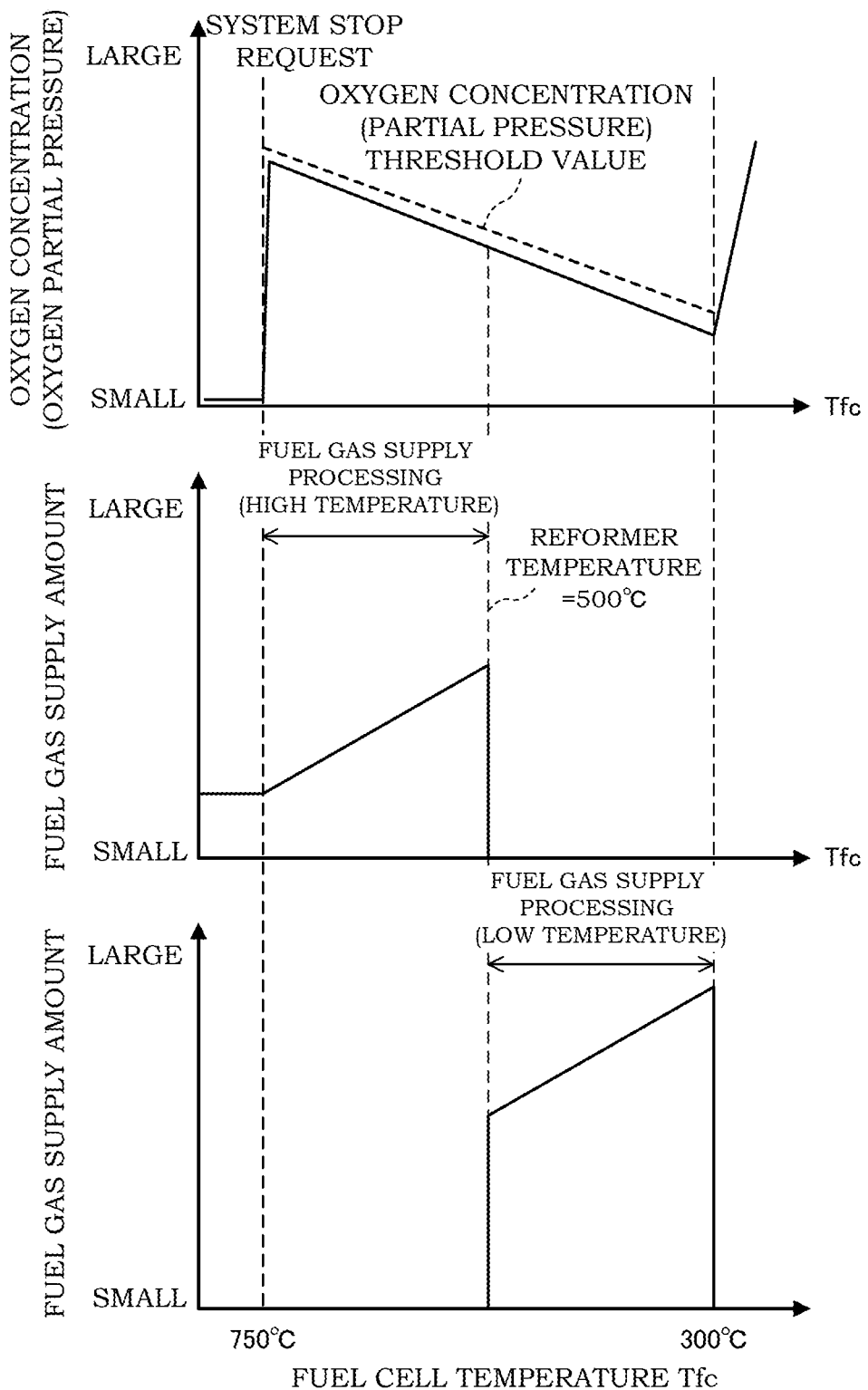
FIG. 8 is a drawing describing a change in a fuel gas supply amount and a change in an oxygen concentration in an anode discharge passage during the system stop control.

With reference to FIG. 6 to FIG. 8, the fuel cell system 100 according to a second embodiment of the present invention will be described. It should be noted that, in the following description, common components with the first embodiment are attached with identical reference numerals and their description is omitted unless necessary.

The fuel cell system 100 according to the second embodiment is approximately identical to the fuel cell system according to the first embodiment, however, is different from that according to the first embodiment in including a temperature sensor 86 and in a content of the system stop control executed by the control unit 80. It should be noted that the fuel cell system 100 according to the embodiment does not necessarily include the oxygen concentration sensor 85.

As illustrated in FIG. 6, the fuel cell system 100 according to the second embodiment includes the temperature sensor 86 in the anode supply passage 21 between the reformer 28 and the fuel cell stack 10. The temperature sensor 86 detects or estimates the temperature of the anode gas passing through the anode supply passage 21. The control unit 80 uses the anode gas temperature in the anode supply passage 21, as the temperature of the reformer 28, detected or estimated by the temperature sensor 86. Thus, the temperature sensor 86 serves as a reformer temperature-sensing unit to detect or estimate the temperature of the reformer 28. It should be noted that instead of disposing the temperature sensor 86 in the anode supply passage 21, this temperature sensor 86 may be disposed in the reformer 28 to directly detect the reformer temperature.

Next, with reference to FIG. 7, the system stop control of the fuel cell system 100 according to the second embodiment will be described. FIG. 7 is a flowchart illustrating the system stop control executed by the control unit 80. The system stop control is executed after the stop request to the fuel cell system 100.

Since the processings of S201 to S206 in FIG. 7 are processings identical to those of S201 to S206 in FIG. 3, the description of these processings is omitted unless necessary. Other processings of S221 to S222 will be described in details.

As illustrated in FIG. 7, when it is determined that the fuel cell temperature Tfc is larger than the reference temperature T1 at S204, the control unit 80 executes the processings at and after S221 in order to reduce the degradation of the anode electrode.

At S221, the control unit 80 compares a reformer temperature Tre detected or estimated by the temperature sensor 86 with a reformer reference temperature T2 to determine whether the reformer temperature Tre is equal to or less than the reformer reference temperature T2. The reformer reference temperature T2 is a reformer activation temperature at which the reformer 28 can reform the evaporated fuel to the anode gas and set to for example 500° C.

At S221, when it is determined that the reformer temperature Tre is larger than the reference temperature T2, the control unit 80 executes the processing of S222.

At S222, the control unit 80 executes a fuel gas supply processing in high temperature in which the anode gas, as the fuel gas, reformed by the reformer 28 is supplied to the anode discharge passage 51. The control unit 80 drives the pump 24 and the injector 25, and further adjusts the pressure control valve 29 to control the amount of the evaporated fuel introduced to the reformer 28. In the fuel cell stack 10, controlling the opening degree of the pressure control valve 29 adjusts the amount of the anode gas supplied to the fuel cell stack 10 from the reformer 28. The reformer 28 and the pressure control valve 29 constitute an anode gas supply unit that supplies the anode gas (fuel gas).

The anode gas reformed by the reformer 28 is supplied to the anode discharge passage 51 through the fuel cell stack 10 currently being cooled. In the second embodiment, the anode gas discharged from the reformer 28 is used as the fuel gas. Thus, supplying the anode gas to the anode discharge passage 51 causes the cathode gas supplied to cool the fuel cell stack 10 to hardly flow into the anode discharge passage 51 from the discharged gas combustor 53, thereby reducing the increase of the oxygen concentration in the anode discharge passage 51. Accordingly, the oxygen concentration in the anode discharge passage 51 exceeding the oxygen concentration threshold value (reference concentration) can be reduced. It should be noted that, also in the second embodiment, the oxygen partial pressure may be the index regarding the oxidative degradation of the anode electrode instead of the oxygen concentration.

In the fuel gas supply processing in high temperature at S222, the control unit 80 increases the supply amount of the anode gas (fuel gas) supplied to the anode discharge passage 51 as the fuel cell temperature Tfc decreases as illustrated in the middle in FIG. 8. In view of this, as illustrated in the top in FIG. 8, the oxygen concentration in the anode discharge passage 51 can be decreased corresponding to the decrease of the fuel cell temperature Tfc, thereby ensuring reducing the oxidative degradation of the anode electrode irrespective of the fuel cell temperature Tfc.

It should be noted that the supply amount of the anode gas introduced from the reformer 28 to the anode discharge passage 51 is determined on the basis of the fuel cell temperature Tfc. The oxygen concentration threshold value can be determined as long as the fuel cell temperature Tfc is known. With this oxygen concentration threshold value and, for example, a volume (already-known parameter) of the anode discharge passage and the anode flow passage in the fuel cell stack 10, the supply amount of the anode gas with which the oxygen concentration in the anode discharge passage 51 does not exceed the oxygen concentration threshold value can be determined.

The processing of S222 is continued until the reformer temperature Tre reaches the reference temperature T2 (such as 500° C.) in the period until the fuel cell temperature Tfc decreases down to the reference temperature T1.

On the other hand, at S221, when it is determined that the reformer temperature Tre is equal to or less than the reference temperature T2, the control unit 80 determines that the reformer temperature Tre decreases to cause a reforming failure, and executes a fuel gas supply processing in low temperature at S206. Supplying the evaporated fuel to the reformer 28 in a low-temperature state fails to reform the evaporated fuel in the reformer 28 and causes a carbon deposition. In order to avoid this, when the reformer temperature Tre becomes equal to or less than the reformer reference temperature T2, a supplier of the fuel gas is switched from the reformer 28 to the injector 73A.

The processing of S206 in FIG. 7 is a processing similar to the processing of S206 in FIG. 3. At S206, the control unit 80 controls the pump 24, the injector 25, and the pressure control valve 29 to stop the supply of the anode gas, opens the open/close valve 73B, and drive the injector 73A to supply the fuel gas evaporated by the electric heater 73C to the anode discharge passage 51. Thus supplying the fuel stored in the fuel tank 22 to the anode discharge passage 51 by the injector 73A during the system stop control (during the fuel cell stack cooling) reduces the increase of the oxygen concentration in the anode discharge passage 51.

At S206, the control unit 80 increases the supply amount of the fuel gas supplied to the anode discharge passage 51 as the fuel cell temperature Tfc decreases as illustrated in the bottom in FIG. 8. In view of this, as illustrated in the bottom in FIG. 8, the oxygen concentration in the anode discharge passage 51 can be decreased corresponding to the decrease of the fuel cell temperature Tfc, thereby ensuring reducing the oxidative degradation of the anode electrode irrespective of the fuel cell temperature Tfc.

In the fuel cell system 100, since the anode electrode is no longer subject to the oxidative degradation occurrence when the fuel cell temperature Tfc decreases down to the reference temperature (such as 300° C.) by the cooling processing during the system stop control, the fuel gas supply processing is stopped and the system stop processing to completely stop the fuel cell system 100 is executed.

With the fuel cell system 100 according to the above-described embodiment, the following effect can be provided.

The fuel cell system 100 further includes the reformer 28 that reforms the fuel supplied from the fuel tank 22 to the anode gas and supplies the reformed anode gas to the fuel cell stack 10. During the system stop (during the system stop control), the reformer 28 serves as the anode gas supply unit that supplies the anode gas as the fuel gas to the anode discharge passage 51.

In particular, the fuel cell system 100 is configured to switch the supplier that supplies the fuel gas to the anode discharge passage 51 during the system stop. That is, in the fuel cell system 100, when the fuel cell temperature Tfc is higher than a reference temperature Tref and the reformer temperature Tre is higher than the reformer reference temperature T2, the anode gas reformed by the reformer 28 is supplied to the anode discharge passage 51 as the fuel gas. In contrast to this, when the fuel cell temperature Tfc is higher than the reference temperature Tref and the reformer temperature Tre is equal to or less than the reformer reference temperature T2, the fuel gas from the injector 73A is supplied to the anode discharge passage 51. Such a configuration also reduces the increase of the oxygen concentration (oxygen partial pressure) in the anode discharge passage 51, thereby ensuring reducing the oxidative degradation of the anode electrode of the fuel cell.

When the anode gas (fuel gas) is supplied to the anode discharge passage 51 by using the reformer 28 comparatively in a high temperature state, the operations of the injector 73A and the electric heater 73C can be stopped, thereby ensuring reducing an electric power consumption in the fuel cell system 100.

Next, with reference to FIG. 6 and FIG. 9, the fuel cell system 100 according to a modification of the second embodiment will be described.

In the fuel cell system 100 according to the modification, the oxygen concentration in the anode discharge passage 51 is detected and the fuel gas supply processing is executed using the oxygen concentration. Accordingly, as illustrated in FIG. 6, the fuel cell system 100 includes the oxygen concentration sensor 85 that detects or estimates the oxygen concentration in the anode discharge passage 51.

Next, with reference to FIG. 9, the system stop control executed by the control unit 80 of the fuel cell system 100 according to the modification will be described. FIG. 9 is a flowchart illustrating the system stop control executed by the control unit 80 of the fuel cell system 100.

Figure 9:
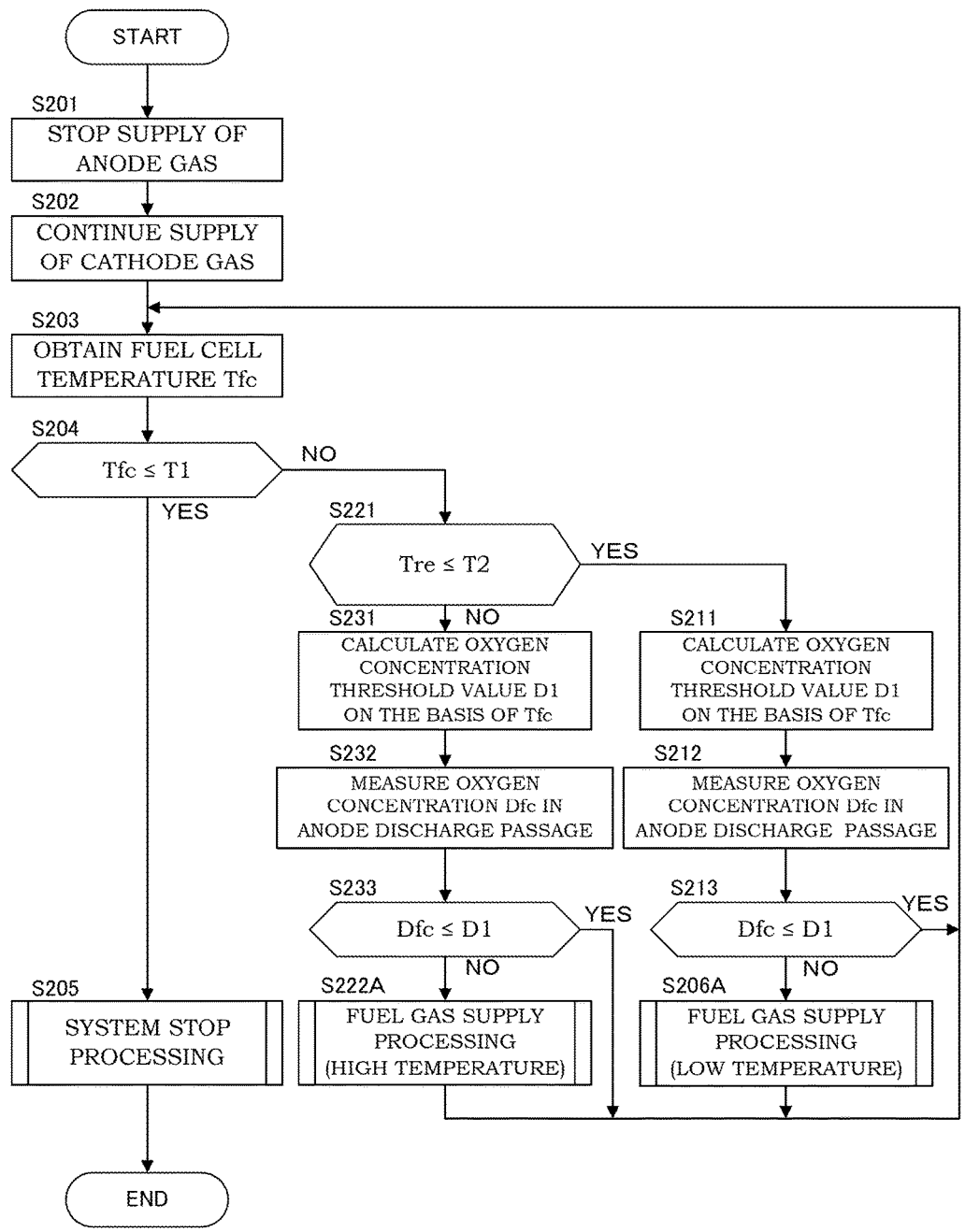
FIG. 9 is a flowchart illustrating a system stop control of the solid oxide fuel cell system according to one modification of the second embodiment.

Since the processings of S201 to S205, S206A, and S211 to S213 in FIG. 9 are processings identical to those of S201 to S205, S206A, S211 to S213 in FIG. 5, the description of these processes is omitted unless necessary. Other processings of S221, S231 to 233, and S222A will be described in details.

As illustrated in FIG. 9, when it is determined that the fuel cell temperature Tfc is larger than the reference temperature T1 at S204, the control unit 80 executes the processings at and after S221 in order to reduce the degradation of the anode electrode.

At S221, the control unit 80 compares the reformer temperature Tre detected or estimated by the temperature sensor 86 with the reformer reference temperature T2 to determine whether the reformer temperature Tre is equal to or less than the reformer reference temperature T2.

At S221, when it is determined that the reformer temperature Tre is larger than the reference temperature T2, the control unit 80 executes the processing of S231.

At S231, the control unit 80 calculates the threshold value D1 of the oxygen concentration in the anode discharge passage 51 on the basis of the fuel cell temperature Tfc detected or estimated by the temperature sensor 83.

As indicated by the dashed line in the top in FIG. 8, the map (characteristic line) showing the relation between the fuel cell temperature Tfc and the oxygen concentration threshold value D1 has been obtained from, for example, a preliminary experiment, and this map is stored in, for example, the ROM in the control unit 80. Accordingly, the control unit 80 can unambiguously calculate the oxygen concentration threshold value D1 corresponding to the fuel cell temperature Tfc on the basis of the fuel cell temperature Tfc. It should be noted that the control unit 80 calculates (sets) the oxygen concentration threshold value D1 to a small value as the fuel cell temperature Tfc decreases.

At S232, the control unit 80 measures the oxygen concentration Dfc in the anode discharge passage 51 using the oxygen concentration sensor 85, and then executes the processing of S233.

At S233, the control unit 80 compares the oxygen concentration Dfc with the oxygen concentration threshold value D1 (reference concentration) calculated at S231 to determine whether the oxygen concentration Dfc is equal to or less than the oxygen concentration threshold value D1.

When the oxygen concentration Dfc in the anode discharge passage 51 is equal to or less than the oxygen concentration threshold value D1, the control unit 80 determines that the oxygen concentration Dfc is so low that there is no possibility of the oxidative degradation of the anode electrode, and executes the processing of S203 again. In contrast to this, when the oxygen concentration Dfc in the anode discharge passage 51 is larger than the oxygen concentration threshold value D1, the control unit 80 determines that there is a possibility of the oxidative degradation of the anode electrode, and executes the fuel gas supply processing in high temperature at S222A.

At S222A, the control unit 80 drives the pump 24 and the injector 25 and further adjusts the pressure control valve 29 to adjust the amount of the anode gas supplied to the fuel cell stack 10 from the reformer 28. Thus supplying the anode gas discharged from the reformer 28 to the anode discharge passage 51 as the fuel gas during the system stop control (during the fuel cell stack cooling) reduces the increase of the oxygen concentration in the anode discharge passage 51. It should be noted that the control unit 80 executes the processings at and after S203 again after the fuel gas supply processing of S222A is terminated.

In the fuel cell system 100 according to the modification, the control unit 80 controls the amount of evaporated fuel introduced to the reformer 28 so as to increase the supply amount of the anode gas (fuel gas) as the deviation between the oxygen concentration Dfc and the oxygen concentration threshold value D1 increases. That is, the reformer 28 is configured so as to adjust the supply amount of the fuel gas corresponding to the oxygen concentration Dfc. More specifically, the reformer 28 is configured so as to increase the supply amount of the anode gas as the value calculated by subtracting the oxygen concentration threshold value D1 from the oxygen concentration Dfc increases.

On the other hand, when it is determined that the reformer temperature Tre is equal to or less than the reference temperature T2 at S221, the control unit 80 executes the process at S211. The processings of S211 to S213 are identical to the processings described in the modification of the first embodiment.

At S213, when it is determined that the oxygen concentration Dfc in the anode discharge passage 51 is larger than the oxygen concentration threshold value D1, the control unit 80 determines that there is a possibility of the oxidative degradation of the anode electrode and executes the fuel gas supply process in low temperature at S206A.

At S206A, the control unit 80 controls the pump 24, the injector 25, and the pressure control valve 29 to stop the supply of the anode gas, open the open/close valve 73B, and drive the injector 73A, to supply the fuel gas evaporated by the electric heater 73C to the anode discharge passage 51. Thus supplying the fuel stored in the fuel tank 22 to the anode discharge passage 51 by the injector 73A during the system stop control (during the fuel cell stack cooling) reduces the increase of the oxygen concentration in the anode discharge passage 51. It should be noted that the control unit 80 executes the processings at and after S203 again after the fuel gas supply processing of S206A is terminated.

At S206A, the control unit 80 controls the injector 73A so as to increase the fuel gas supply amount as the deviation between the oxygen concentration Dfc and the oxygen concentration threshold value D1 increases. That is, the injector 73A is configured so as to increase the supply amount of the fuel gas as the value calculated by subtracting the oxygen concentration threshold value D1 from the oxygen concentration Dfc increases.

As described above, in the processings of S222A and S206A, the fuel gas is supplied corresponding to the deviation amount between the oxygen concentration Dfc in the anode discharge passage 51 and the oxygen concentration threshold value D1; therefore without wastefully consuming the fuel, the oxygen concentration in the anode discharge passage 51 can be surely decreased. Accordingly, the oxidative degradation of the anode electrode can be efficiently reduced with the fuel gas supply amount corresponding to the oxygen concentration Dfc in the anode discharge passage 51.

It should be noted that, in consideration of the fact that the oxidative degradation of the anode easily occurs as the fuel cell temperature Tfc decreases when the fuel cell temperature Tfc is larger than the reference temperature T1 (such as 300° C.), the control unit 80 sets the oxygen concentration threshold value D1 to a small value as the fuel cell temperature Tfc decreases. This ensures controlling the fuel gas supply amount by taking the relation between the fuel cell temperature and the oxygen concentration into account to make it possible to surely reduce the oxidative degradation of the anode electrode with a minimum necessary fuel gas supply amount.

The embodiment of the present invention described above are merely illustration of one application example of the present invention and not of the nature to limit the technical scope of the present invention to the specific constructions of the above embodiments.

In the fuel cell system 100, stopping the supply of the anode gas while continuing the supply of the cathode gas executes a forcible cooling of the fuel cell stack 10. A cooling processing other than the forcible cooling may be executed. For example, the fuel cell system 100 may be configured so as to stop the supply of the cathode gas and the anode gas to naturally cool the fuel cell stack 10, or may be configured so as to use a refrigerant, such as a cooling water, to cool the fuel cell stack 10. Even when such a cooling processing is employed, supplying the fuel gas using the fuel stored in the fuel tank 22 into the anode discharge passage 51 during the system stop (during the system stop control) ensures reducing the oxidative degradation of the anode electrode.

This application is based on and claims priority to Japanese Patent Application No. 2015-244472, filed in Japan Patent Office on Dec. 15, 2015, the entire content of which is incorporated herein by reference.

The invention claimed is:

1. A fuel cell system including a solid oxide fuel cell configured to receive a supply of an anode gas and a cathode gas to generate electric power, the fuel cell system comprising:
   an anode discharge passage through which an anode off-gas discharged from the fuel cell flows;
   a cathode discharge passage through which a cathode off-gas discharged from the fuel cell flows;
   a joining portion where the anode discharge passage and the cathode discharge passage join;
   a gas supply unit configured to supply a fuel gas using a fuel stored in a fuel tank into the anode discharge passage during a system stop;
   a temperature-sensing unit configured to detect or estimate a temperature of the fuel cell; and
   a control unit programmed to control the gas supply unit, wherein
   the control unit is programmed to control the gas supply unit in supplying the fuel gas to the anode discharge passage on the basis of the temperature of the fuel cell during the system stop.

2. The fuel cell system according to claim 1, wherein
   the control unit is programmed to control the gas supply unit such that a fuel gas is supplied to the anode discharge passage when the temperature of the fuel cell is higher than a reference temperature at which an anode electrode of the fuel cell is not oxidized during the system stop.

3. The fuel cell system according to claim 2, wherein
   the control unit is programmed to control the gas supply unit so as to increase a fuel gas supply amount as the temperature of the fuel cell decreases.

4. The fuel cell system according to claim 2, further comprising
   an oxygen concentration detecting unit configured to detect or estimate an oxygen concentration in the anode discharge passage, wherein
   the control unit is programmed to control the gas supply unit so as to adjust a fuel gas supply amount corresponding to the oxygen concentration.

5. The fuel cell system according to claim 4, wherein
   the control unit is programmed to control the gas supply unit so as to increase a fuel gas supply amount as a deviation between the oxygen concentration and a reference concentration with which the anode electrode of the fuel cell is not oxidized increases.

6. The fuel cell system according to claim 5, wherein
   the reference concentration is set smaller as the temperature of the fuel cell decreases.

7. The fuel cell system according to claim 2, wherein
   the gas supply unit comprises an injector disposed in the anode discharge passage, the injector being configured as a supply unit different from an anode gas supply unit configured to supply an anode gas to the fuel cell,
   the injector includes a heating apparatus that evaporates a fuel supplied from the fuel tank, and
   the control unit is programmed to control the injector so as to supply the evaporated fuel to the anode discharge passage as a fuel gas.

8. The fuel cell system according to claim 7, further comprising:
   a reformer that constitutes the anode gas supply unit, the reformer reforming a fuel supplied from the fuel tank to an anode gas, the reformer supplying the anode gas to the fuel cell; and
   a reformer temperature-sensing unit configured to detect or estimate a temperature of the reformer, wherein
   the control unit is programmed such that, when the temperature of the fuel cell is higher than the reference temperature and the temperature of the reformer is higher than a reformer reference temperature, an anode gas reformed by the reformer is supplied to the anode discharge passage as a fuel gas, and
   the control unit is programmed such that, when the temperature of the fuel cell is higher than the reference temperature and the temperature of the reformer is equal to or less than the reformer reference temperature, an evaporated fuel from the injector is supplied to the anode discharge passage.

9. The fuel cell system according to claim 1, wherein
   the joining portion is a discharged gas combustor that combusts an anode off-gas and a cathode off-gas.

10. A control method for a fuel cell system including a solid oxide fuel cell configured to receive a supply of an anode gas and a cathode gas to generate electric power, an anode discharge passage and a cathode discharge passage through which an anode off-gas and a cathode off-gas discharged from the fuel cell respectively flow, a joining portion where the anode discharge passage and the cathode discharge passage join, and a control unit pro rammed to control supply of a fuel gas, the control method comprising:
    detecting or estimating a temperature of the fuel cell; and
    controlling supply of the fuel gas using a fuel stored in a fuel tank into the anode discharge passage on the basis of the temperature of the fuel cell during a system stop.

11. The control method for the fuel cell system according to claim 10, comprising:
    controlling supply of the fuel gas to the anode discharge passage when the temperature of the fuel cell is higher than a reference temperature at which an anode electrode of the fuel cell is not oxidized during the system stop.

12. The control method for the fuel cell system according to claim 11, comprising:
    controlling the fuel gas supply amount so as to increase as the temperature of the fuel cell decreases.

13. The control method for the fuel cell system according to claim 11, comprising:
    detecting or estimating an oxygen concentration in the anode discharge passage, and
    controlling the fuel gas supply so as to adjust a supply amount of the fuel gas corresponding to the oxygen concentration.

14. The control method for the fuel cell system according to claim 13, comprising:
    controlling the fuel gas supply amount so as to increase as a deviation between the oxygen concentration and a reference concentration with which the anode electrode of the fuel cell is not oxidized increases.

15. The control method for the fuel cell system according to claim 14, wherein
the reference concentration is set smaller as the temperature of the fuel cell decreases.

16. The control method for the fuel cell system according to claim 11, wherein
the fuel cell system comprises an injector disposed in the anode discharge passage, the injector being configured as a supply unit different from an anode gas supply unit configured to supply an anode gas to the fuel cell,
the injector includes a heating apparatus that evaporates a fuel supplied from the fuel tank, and
the evaporated fuel, as the fuel gas, from the injector is supplied to the anode discharge passage.

17. The control method for the fuel cell system according to claim 16,
the fuel cell system comprises a reformer that constitutes the anode gas supply unit, the reformer reforming a fuel supplied from the fuel tank to an anode gas, the reformer supplying the anode gas to the fuel cell; and
wherein the control method comprises detecting or estimating a temperature of the reformer,
when the temperature of the fuel cell is higher than the reference temperature and the temperature of the reformer is higher than a reformer reference temperature, an anode gas reformed by the reformer is supplied to the anode discharge passage as the fuel gas, and
when the temperature of the fuel cell is higher than the reference temperature and the temperature of the reformer is equal to or less than the reformer reference temperature, the evaporated fuel from the injector is supplied to the anode discharge passage.

* * * * *